Figure 1:
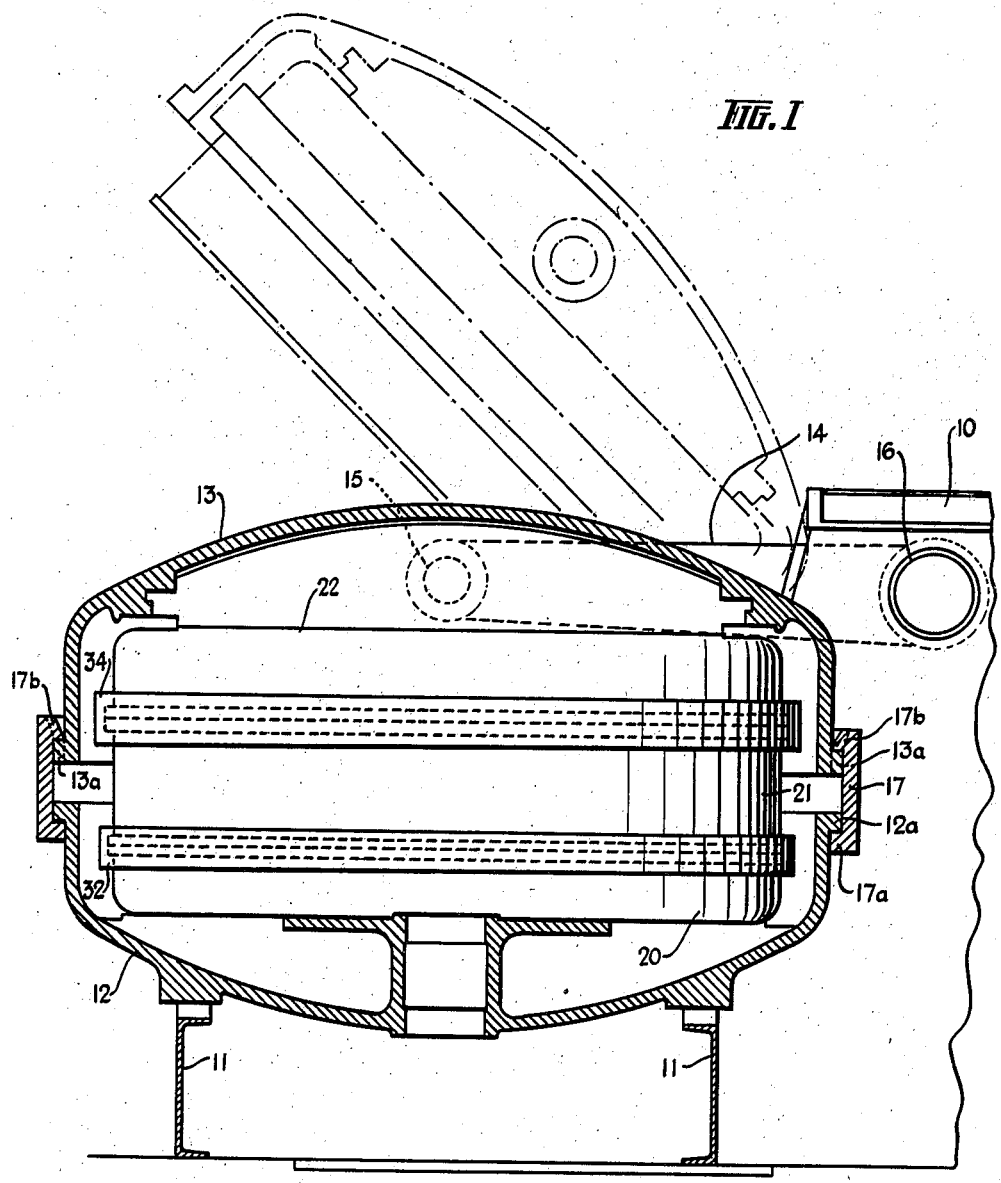

July 21, 1942.  G. P. BOSOMWORTH ET AL  2,290,630
VULCANIZING PRESS
Filed March 20, 1941    5 Sheets-Sheet 1

INVENTORS
GEORGE P. BOSOMWORTH
AND
EDWARD HECK
BY
ATTORNEYS

July 21, 1942.  G. P. BOSOMWORTH ET AL  2,290,630
VULCANIZING PRESS
Filed March 20, 1941  5 Sheets-Sheet 2
FIG. II
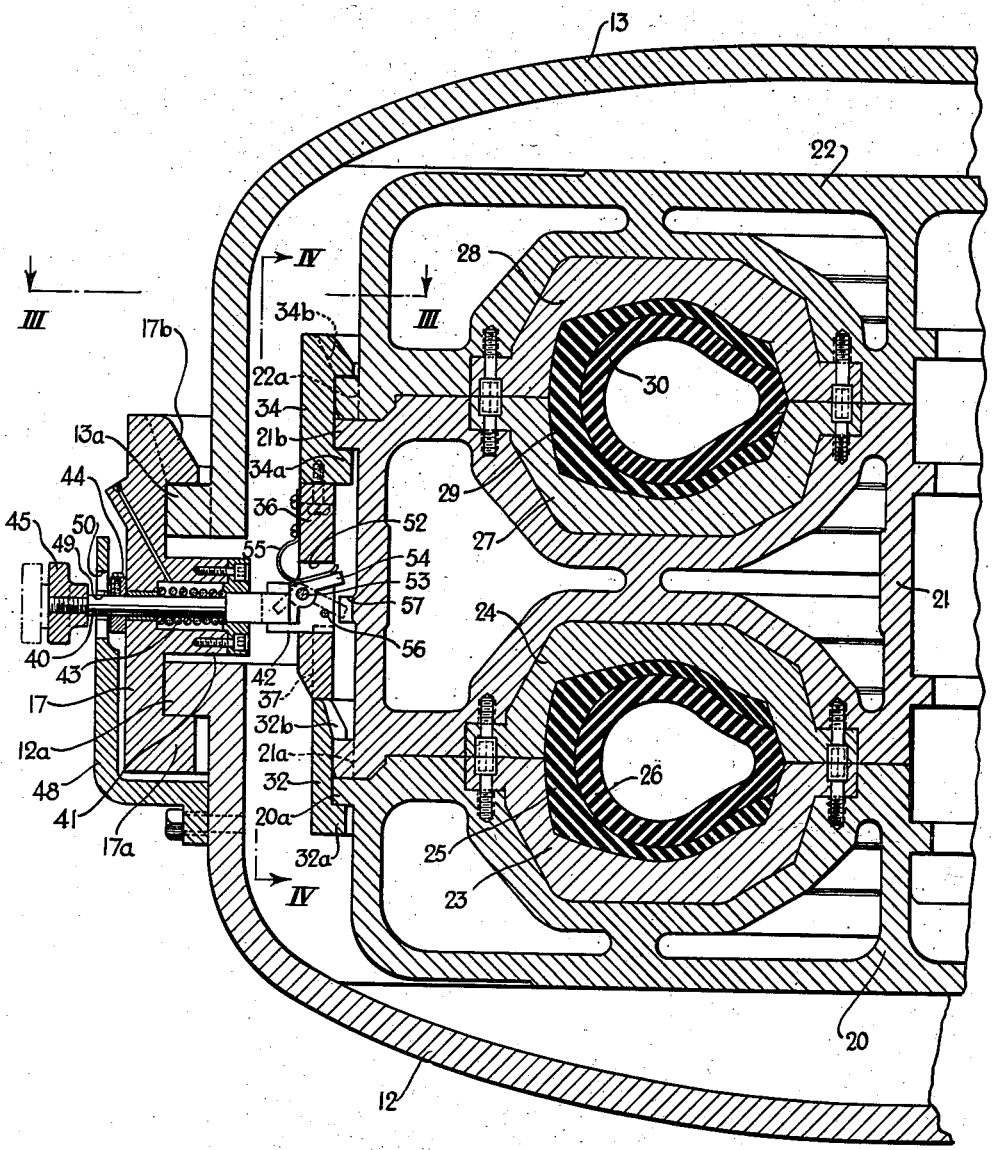
INVENTORS
GEORGE P. BOSOMWORTH
AND
EDWARD HECK
BY
Ely & Frye
ATTORNEYS

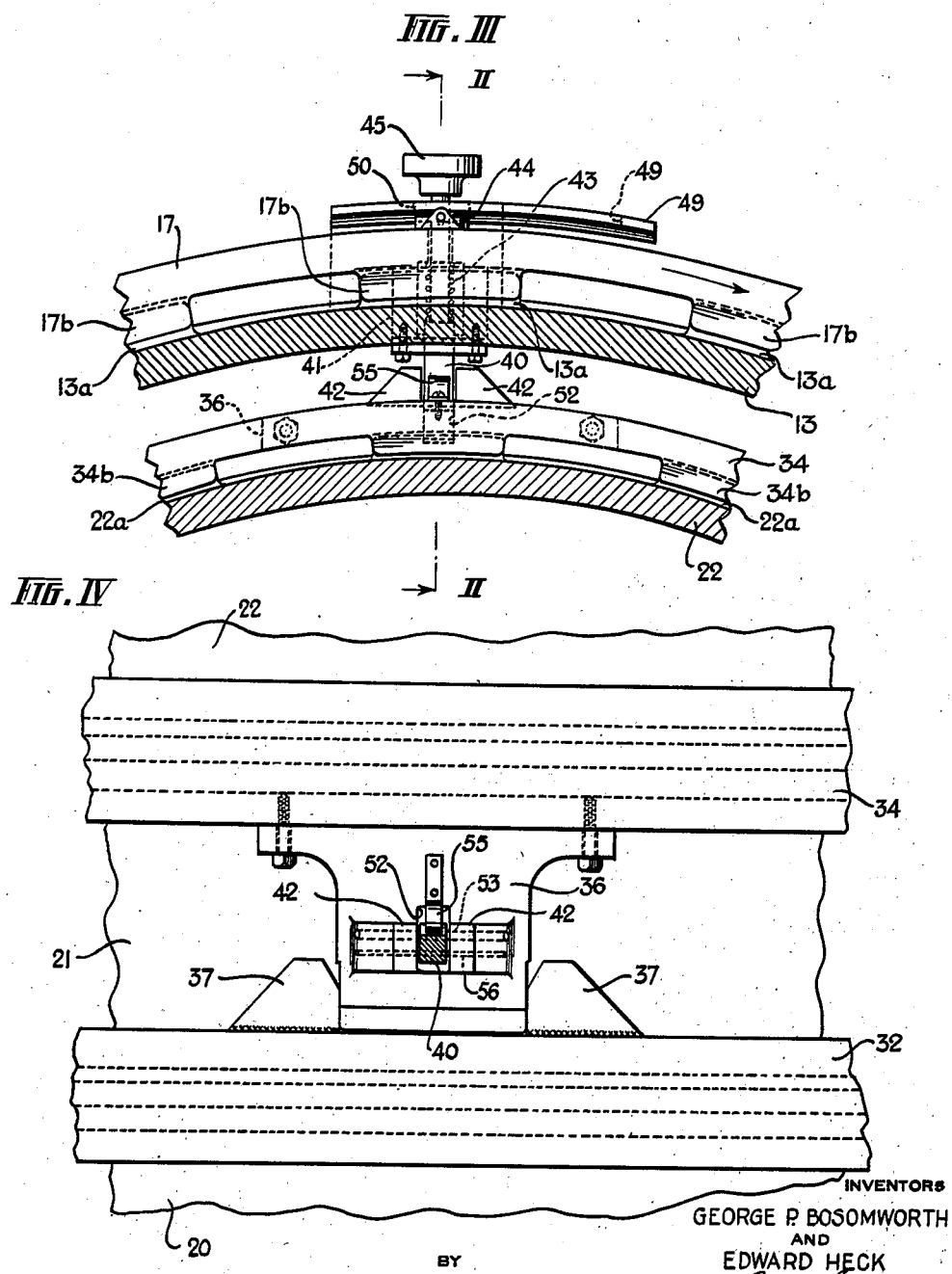

July 21, 1942.    G. P. BOSOMWORTH ET AL    2,290,630
VULCANIZING PRESS
Filed March 20, 1941    5 Sheets-Sheet 4
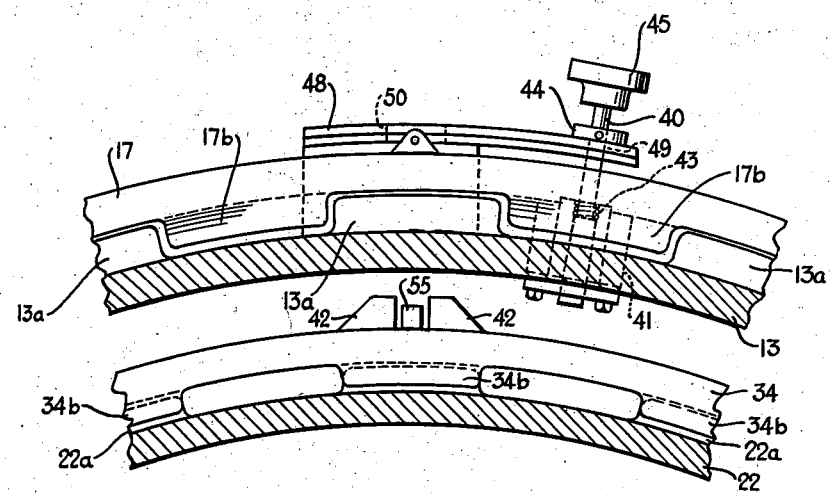
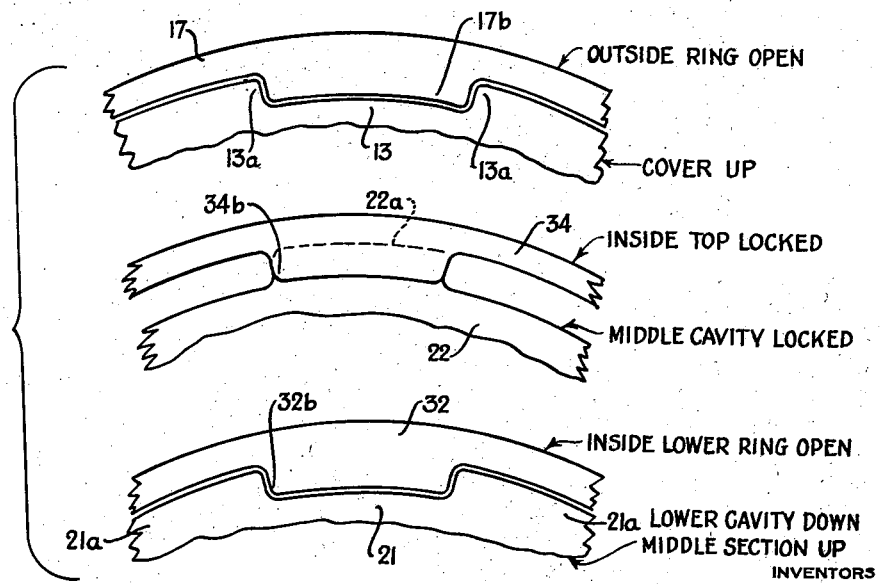

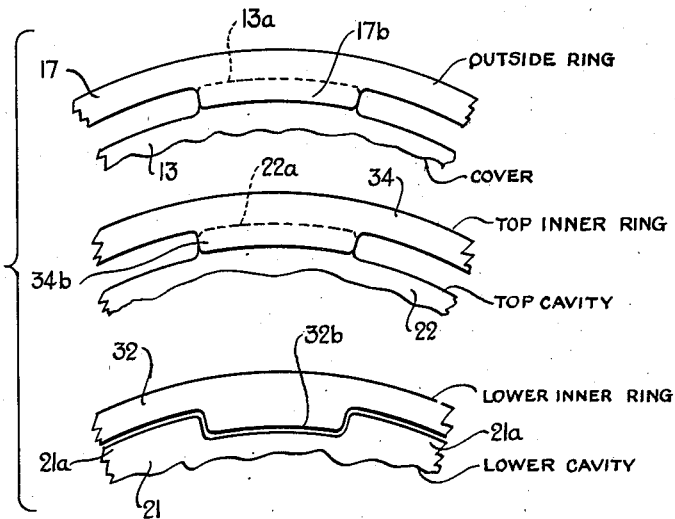
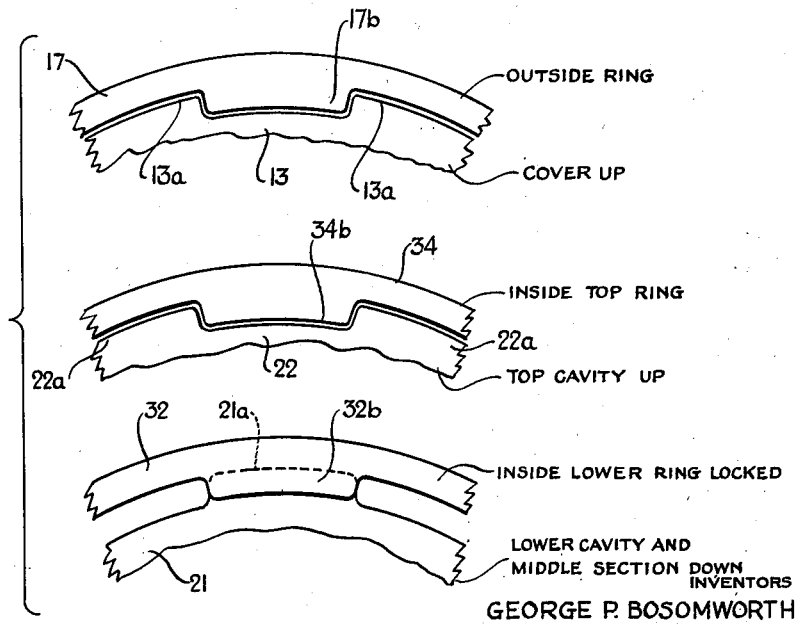

Patented July 21, 1942

2,290,630

UNITED STATES PATENT OFFICE 2,290,630

VULCANIZING PRESS

George P. Bosomworth and Edward Heck, Akron, Ohio, assignors to The Firestone Tire & Rubber Company, Akron, Ohio, a corporation of Ohio Application March 20, 1941, Serial No. 384,326

17 Claims. (Cl. 18—17)

This invention relates to vulcanizing presses of the watchcase type arranged in horizontal position, and more especially it relates to dual vulcanizing presses arranged for the concurrent vulcanization of two work pieces in a single power operated press.

The press is of especial utility in the manufacture of pneumatic tire casings and inner tubes, and substantial savings are effected in the cost of original equipment, economy of floor space, and increase in the output of the press.

The press comprises a hollow vulcanizer including a stationary section and a movable section or cover, and two steam jacketed molds mounted within the vulcanizer, said molds consisting of three mold sections that are co-axially arranged to define two molding cavities.

The chief object of the invention is to provide a vulcanizing press of the character mentioned wherein the two molds within the vulcanizer may be selectively opened with the opening of the vulcanizer. More specifically the invention aims to provide locking and unlocking means for the respective molds within the vulcanizer, including means for operating the same through the agency of the locking and unlocking means of the vulcanizer. Other objects will be manifest as the description proceeds.

Of the accompanying drawings:

Figure I is a somewhat diagrammatic vertical diametric section of a dual vulcanizing press embodying the invention;

Figure II is a fragmentary vertical section thereof, on a larger scale, showing details of the interconnection between the mold locking means and the vulcanizer locking means, as viewed from the line II—II of Figure III;

Figure III is a section on the line III—III of Figure II;

Figure IV is a section on the line IV—IV of Figure II;

Figure V is a section similar to Figure III showing the parts as they appear when the upper mold is locked and the vulcanizer is unlocked;

Figure VI is a diagrammatic view showing the normal position of the mold locking means and vulcanizer locking means, the vulcanizer and the upper mold being locked and the lower mold being unlocked;

Figure VII is a diagrammatic view showing the mold and vulcanizer locking means when the vulcanizer and upper mold are unlocked and the lower mold is locked; and Figure VIII is a diagrammatic view showing the mold and vulcanizer locking means when the vulcanizer and the lower mold are unlocked and the upper mold is locked.

Referring to Figure I of the drawings, there is shown somewhat diagrammatically, a vulcanizing press such as embodies the invention, said press comprising a housing 10 that includes a stationary support 11, a stationary lower vulcanizer section 12 mounted upon the support 11, a movable upper vulcanizer section or cover 13, and a pair of arms, such as the arm 14, for raising and lowering the cover 13 between the position shown in full lines and the position shown in broken lines in said figure. The arms 14 are pivotally connected to the cover 13 at diametrically opposite points 15, and are pivotally supported on the housing 10 at 16, there being power-operated means (not shown) that effect the swinging of the arms 14 in the usual manner. The vulcanizer sections 12, 13 are of concavo-convex shape and have their concave sides in confronting relation so as to define a chamber for vulcanizing molds. The margins or edges of the sections 12, 13 do not meet in the closed position of the vulcanizer, but are somewhat spaced apart as shown, and a locking ring 17 is provided for retaining the sections in closed position. Said locking ring is suitably supported upon the lower section 12, and the usual means (not shown) is provided for imparting limited rotary movement to said ring. The lower margin of the ring 17 is formed with a radially inwardly extending flange 17a that underlies a radially outwardly extending flange 12a formed on the margin of the lower vulcanizer section 12. The upper margin of the ring 17 is formed with a circumferential series of inwardly extending lugs 17b, 17b that are spaced apart from each other a distance slightly greater than the length of a lug. In like manner the lower margin of the cover section 13 is formed with a circumferential series of radially outwardly extending lugs 13a, 13a, the construction being such as to provide a bayonet locking arrangement between the cover section 13 and the locking ring 17, as is common practice in this art. Thus when the lugs 17b are in registry with the lugs 13a, the cover section 13 is retained in closed position. When the ring 17 is turned angularly so that the lugs 17b thereof are in registry with the spaces between lugs 13a, the cover section 13 may be opened and closed.

Mounted interiorly of the vulcanizer is a dual mold comprising a lower mold section 20, an intermediate mold section 21, and an upper mold section 22, the latter being secured to the vulcanizer cover 13. The lower mold section 20 may be fixedly secured to the stationary vulcanizer section 12, but if desired, means (not shown) may be employed for urging the upper and lower mold sections 22, 20 toward each other as is common practice in presses of this general type. The upwardly presented side of the lower mold section 20 is formed with a recess in which is removably mounted a molding insert 23, and the downwardly presented side of the intermediate mold section 21 is similarly formed with a recess in which is mounted a molding insert 24. When the mold sections 20, 21 are in mating relation, the inserts 23, 24 define a molding cavity, which, in the illustrative embodiment of the invention herein shown, is designed to receive a pneumatic tire casing 25. The latter is shown with the usual expansible core 26 therein, which core is heated and distended by means of hot fluid under pressure that is admitted thereto through the agency of the usual inflation stem (not shown), whereby the tire is subjected to internal heat and pressure during vulcanization. In like manner the upwardly presented side of the intermediate mold section 21 is formed with a recess for receiving a molding insert 27, and the downwardly presented side of the upper mold section 22 is recessed to receive a mold insert 28 that mates with the insert 27 to define a molding cavity for a second pneumatic tire casing 29. The latter may be identical with the tire casing 25 in the lower mold, or it may differ therefrom as desired. The usual expansible core 30 is mounted in the tire casing 29 during a vulcanizing operation. The mold sections 20, 21, and 22 are steam jacketed, and steam is circulated therethrough in the usual manner for supplying heat exteriorly to the tires 25 and 29 to effect the vulcanization thereof.

Suitably supported upon the lower mold section 20 is a locking ring 32 that has its lower margin formed with a radially inwardly extending circumferential flange 32$^a$ that underlies a radially outwardly extending flange 20$^a$ formed on the upper peripheral margin of the said mold section 20. The upper margin of the ring 32 is formed with a circumferential series of inwardly extending locking lugs 32$^b$, 32$^b$ that are spaced apart from each other a distance slightly greater than the length of a single lug. In like manner the lower peripheral margin of the intermediate mold section 21 is formed with a circumferential series of radially outwardly extending lugs 21$^a$, 21$^a$, the construction being such as to provide a bayonet lock between the lower mold section 20 and the intermediate mold section 21, as is well understood. The said mold sections are locked together when the lugs 32$^b$ are in registry with the lugs 21$^a$, and the ring 32 is arranged for limited rotary movement, by means presently to be described, for moving said lugs into and out of registry.

In like manner a locking ring 34 is mounted for limited rotary movement at the top of intermediate mold section 21, said ring having its lower margin formed with a radially inwardly extending circumferential flange 34$^a$ that underlies a radially outwardly extending flange 21$^b$ formed on the upper peripheral margin of the said mold section 21. The upper margin of the ring 34 is formed with a circumferential series of inwardly extending locking lugs 34$^b$, 34$^b$ similar to the locking lugs of the ring 32 previously described. In like manner, the lower peripheral margin of the upper mold section 22 is formed with a circumferential series of radially outwardly extending lugs 22$^a$, 22$^a$, the construction providing a bayonet lock between the intermediate mold section 21 and the upper mold section 22.

The intermediate mold section 21 and the upper mold section 22 are so constructed and arranged that the locking lugs 21$^a$, 22$^a$ thereof are in vertical alignment, axially of the press. The locking rings 32, 34, although of substantially identical construction, are not arranged with their locking lugs 32$^b$, 34$^b$ in axial alignment, but are so angularly positioned with relation to each other that the lugs of one ring are vertically aligned with the inter-lug spaces of the other ring. The locking rings 32, 34 always are in the angular relationship described, and means is provided whereby they may be oscillated in unison so as to maintain said relationship. Said means comprises an interlock bracket 36 that is secured to the bottom face of the upper ring 34 and extends downwardly therefrom to the top face of the lower ring 32, the latter having a pair of guide lugs 37, 37 permanently secured to its top face and defining a space in which the lower end of the bracket 36 is receivable. The bracket 36 moves into and out of the space between the lugs 37, upon occasion, and the latter may be suitably beveled as shown in Figure IV to guide the bracket therebetween. The relative angular positions of the locking rings 32, 34 are such that when one pair of mold sections 20, 21 or 21, 22 is locked together by a locking ring, the other pair of mold sections is in unlocked condition.

Oscillation of the locking rings 32, 34 in unison is effected by oscillation of the vulcanizer locking ring 17 at times when the vulcanizer is closed, and to this end a releasable connection is provided between the locking ring 17 and the interlock bracket 36. Said connection comprises a spring bolt 40 that is slidably mounted in a suitable radial bore in the ring 17 and a boss 41 formed on the inner circumference of the ring between the confronting margins of the vulcanizer sections 12, 13. The inner end of the bolt 40 is squared as shown, and is receivable in a slot defined by a pair of laterally spaced apart lugs 42, 42 formed on the outwardly presented face of the interlock bracket 36. A compression spring 43 mounted within a recess in the boss 41 normally urges the bolt 40 inwardly toward the bracket 36, and for limiting the inward movement of the bolt under the impetus of said spring, a collar 44 is mounted upon the bolt radially outwardly of the ring 17. The outer end of the bolt 40 is provided with a knob 45 that enables the bolt to be pulled outward, manually, against the force of the spring 43, upon occasion as presently will be explained. The arrangement is such that when the bolt 40 is in its inner position with its inner end between lugs 42 of bracket 36, oscillatory movement of the locking ring 17 relatively of the vulcanizer sections 12, 13 will produce similar movement of the locking rings 32, 34 relatively of the mold sections 20, 21, 22.

Sometimes it is required that the ring 17 oscillate without effecting similar oscillation of the rings 32, 34, and this result is accomplished by holding the bolt 40 in retracted position during such oscillation of the ring 17. To this end, an angular bracket 48 is mounted upon the stationary lower vulcanizer section 12, below the ring 17, said bracket having an upstanding portion that is disposed adjacent to and radially outwardly of the periphery of said ring. The bracket 48 is formed with a slot 49, through which the bolt 40 extends, the knob 45 of the bolt being disposed radially outwardly of said bracket. One end of the slot 49 terminates in a circular aperture 50 of such size as to enable the bolt collar 44 to pass therethrough, said collar and said aperture being in axial alignment when the ring 17 is in the position that locks the vulcanizer section 13 to vulcanizer section 12. The arrangement is such that the ring 17 may oscillate while the bolt 40 is in its inner or projected position, the collar 44 then being disposed between said ring and the bracket 48, as shown in full lines in Figures II and III. When it is desired to oscillate the ring 17 with the bolt 40 in retracted position, the knob 45 is manually drawn to the position shown in broken lines in Figure II before movement of the ring is started, with the result that the collar 44 is drawn through the aperture 50, and is retained against the outer face of the bracket 48, as shown in Figure V, while the ring oscillates, since the slot 49 is too narrow to permit the collar to pass therethrough. Oscillation of the ring 17, while the bolt 40 is retracted, does not produce any corresponding oscillation of the locking rings 32, 34.

Between the lugs 42, 42 the bracket 36 is formed with a through slot 52, and pivotally mounted upon a pin 53 that traverses said slot is an angular safety catch 54, one leg of which projects through the slot 52 toward the intermediate mold section 21. The other arm of the catch is disposed at such an angle as to be engaged by the end of the bolt 40 when the latter is in its projected position between the lugs 42. The catch 54 normally is urged to a determinate angular position by a leaf spring 55 that is secured to the bracket 36 and engages that leg of the catch that projects through slot 52. In said angular position, said leg of the catch rests upon a stop pin 56 that extends transversely of the slot 52, the free end portion of said leg being receivable in a recess or slot formed by two spaced apart lugs, such as the lugs 57, Figure II, that project radially from the perimeter of the intermediate mold section 21. The arrangement is such that when the bolt 40 is in its projected position, its inner end engages a leg of the catch 54 and so angularly moves the latter that the other leg thereof is tilted upwardly, against the force of the spring 55, and thereby moved out of the slot between the lugs 57 of the intermediate mold section as is clearly shown in full lines in Figure II. When the bolt 40 is in retracted position, the position of the catch 54 is reversed and its inwardly extending leg rests upon the pin 56 with its free end disposed between said lugs 57, as indicated in broken lines in Figure II.

The operation of the improved press is as folows: Vulcanization of the work pieces in the press is effected while the various elements of the press are in the relative positions shown in Figure II. Thus, the vulcanizer sections 12, 13 are closed, and are locked by the locking ring 17, the upper mold section 22 is closed upon the intermediate mold section 21 and locked thereto by the locking ring 34, and the intermediate mold section 21 is closed upon the lower mold section 20 and held tightly thereagainst by reason of the closed condition of the vulcanizer sections 12, 13, the lower locking ring 32 being unlocked. This relative positioning of the several locking rings and their cooperating elements is diagrammatically illustrated in Figure VI. When vulcanization of the tires 25, 29 in the press is completed, the expansible cores 26, 30 therein are evacuated in the usual manner preparatory to the opening of the press.

In effecting the initial opening of the press, the operator manually retracts the bolt 40, against the pressure of spring 43, and concurrently causes the locking ring 17 to move angularly in clockwise direction, as indicated by the arrow in Figure III. As soon as movement of the ring 17 begins, the operator may release the bolt 40 since the collar 44 prevents inward movement of the bolt by reason of its engagement with the outer face of bracket 48. The ring 17 rotates a determinate distance sufficient to unlock the vulcanizer cover 13, and then stops. In the retracted position of the bolt 40, the inner end thereof is withdrawn from the slot between lugs 42 of bracket 36 so that the angular movement of ring 17 produces no movement of rings 32, 34. The relative positions of the locking elements of the press at this time is diagrammatically shown in Figure VIII. While the bolt 40 is retracted, the safety catch 54 is in position between the lugs 57 of intermediate mold section 21. The vulcanizer cover 13 then may be raised, and in rising, it carries with it the upper mold section 22, and the intermediate mold section 21 that is locked thereto by ring 34, as is indicated in broken lines in Figure I. Elevation of mold section 21 separates it from mold section 20 and exposes the tire 25 in the cavity between said sections. Said tire may then be removed from the press and an unvulcanized tire mounted in place thereof. The operations described are then reversed to close the press and to lock the same by means of the ring 17. As the latter returns to locking position the collar 44 of bolt 40 is moved into registry with aperture 50 of bracket 48, thereby enabling spring 43 to restore said bolt to its projected position. Engagement of the safety catch 54 with lugs 57 of mold section 21 during the foregoing operations assures that the locking ring 34 will not turn angularly to the slightest extent from any cause whatsoever.

The press is then opened a second time, the locking ring 17 being turned angularly while the bolt 40 is in projected position, in which position the end of the bolt is between lugs 42 of bracket 36 and the safety catch 54 is lifted out of the slot between lugs 57 of mold section 21. Because bolt 40 is engaged with said lugs 42, rotary movement of locking ring 17 effects similar rotary movement of locking rings 32 and 34 with the result that upper mold section 22 is unlocked from intermediate mold section 21, and the latter mold section concurrently is locked to the lower mold section 20. The relative positions of the several locking elements of the press at this time are diagrammatically shown in Figure VII. The vulcanizer cover 13 again is raised, and in rising it carries with it the upper mold section 22 which is thereby separated from the intermediate mold section to expose the tire 29 in the upper cavity of the latter. The tire 29 is then removed, and is replaced by an unvulcanized tire in the usual manner. The operations described are then reversed to effect the closing and locking of the press, after which vulcanization of the tires therein proceeds in the usual manner. This completes a cycle of operation of the press which is repeated as often as a vulcanizing operation is completed.

The invention provides a simple and easily operated mechanism for selectively opening the respective molds of a dual vulcanizing press, and achieves the other advantages set out in the foregoing statement of objects.

Modification may be resorted to without departing from the spirit of the invention, or the scope thereof as defined by the appended claims.

What is claimed is:

1. In a vulcanizer press of the character described, the combination of a pair of vulcanizer sections movable relatively of each other to open and close the press, locking means for retaining said sections in closed position, a pair of vulcanizing molds within the sections, respective locking means for said molds, and means operable from the exterior of the closed sections for concurrently unlocking one of said molds while locking the other mold.

2. In a vulcanizing press of the character described, the combination of a pair of vulcanizer sections movable relatively of each other to open and close the press, locking means for retaining said sections in closed condition, a pair of vulcanizing molds within the sections, respective locking means for said molds, and means controlled by the operation of the vulcanizer locking means for unlocking one of said molds while concurrently locking the other mold.

3. A combination as defined in claim 2, wherein the means controlled by the operation of the vulcanizer locking means is manually adjustable so as to enable either of the two molds selectively to be locked or unlocked.

4. In a vulcanizing press of the character described, the combination of a pair of vulcanizer sections movable relatively of each other to open and close the press, locking means for retaining said sections in closed position, a pair of superposed annular vulcanizing molds within the sections, circumferential locking rings for the respective molds rotatable a limited distance to lock and unlock the molds, and means so connecting said locking rings to the vulcanizer locking means as to effect concurrent rotary movement of the locking rings by reason of the operation of the vulcanizer locking means.

5. A combination as defined in claim 4, including means so interconnecting the two mold locking rings as to enable concurrent rotation thereof through the agency of a single connection with the vulcanizer locking means.

6. In a vulcanizing press of the character described, the combination of a pair of vulcanizer sections movable relatively of each other to open and close the press, a rotatable circumferential locking ring for retaining said sections in closed condition, a pair of superposed annular molds within the sections, circumferential locking rings for the respective molds rotatable a limited distance to lock and unlock the molds, and means connecting the vulcanizer locking ring to both mold locking rings so that rotation of the vulcanizer locking ring concurrently effects rotation of both mold locking rings.

7. A combination as defined in claim 6, in which the mold locking rings are so angularly positioned with relation to each other that when one mold is locked the other mold is unlocked.

8. In a dual vulcanizing press, the combination of a pair of vulcanizer sections movable relatively of each other to open and close the press, said sections having confronting margins that are spaced apart from each other in the closed position of the press, a rotatable circumferential locking ring for retaining the sections in closed condition, a pair of co-axially arranged annular molds within the sections, circumferential locking rings for the respective molds rotatable a limited distance to lock and unlock the molds, and means carried by the vulcanizer locking ring and connectable with the mold locking rings for effecting concurrent rotation of the latter when the vulcanizer locking ring is rotated, said means extending between the confronting margins of the vulcanizer sections.

9. In a dual vulcanizing press, the combination of a stationary vulcanizer section, a vulcanizer section movable relatively thereof to open and close the press, a rotatable circumferential locking ring for retaining said sections in closed condition, a pair of molds within the press, said molds comprising a section secured to the stationary vulcanizer section, a section secured to the movable vulcanizer section, an intermediate mold section, rotatable locking means for connecting the stationary mold section to the intermediate mold section and for connecting the intermediate mold section to the movable mold section at different positions circumferentially thereof, and means carried by the vulcanizer locking ring engageable with said mold locking means for rotating same when the vulcanizer locking ring is rotated.

10. A combination as defined in claim 9, in which the mold locking means is so arranged that normally it is in mold-locking relation with the intermediate mold section and one of the other mold sections and in mold-unlocking relation with the third mold section.

11. In a dual vulcanizer, the combination of a stationary vulcanizer section, a vulcanizer section movable relatively thereof to open and close the press, the confronting margins of the sections being in spaced apart relation, a rotatable circumferential locking ring for retaining said sections in closed condition, a pair of molds within the vulcanizer, said molds comprising a stationary section secured to the stationary vulcanizer section, a section secured to the movable vulcanizer section, an intermediate mold section, a pair of circumferential locking rings for connecting the stationary mold section to the intermediate mold section and for connecting the intermediate mold section to the movable mold section, one of said rings being in mold locking position when the other is in mold unlocking position, and means carried by the vulcanizer locking ring and extending between the confronting margins of the vulcanizer sections into the interior of the vulcanizer adapted operatively to engage the mold rings so as to effect concurrent rotation thereof when the vulcanizer locking ring is rotated.

12. A combination as defined in claim 11, in which the last mentioned means is a spring bolt that is manually operable from the exterior of the press to disengage it from operative engagement with the mold locking rings.

13. A combination as defined in claim 11, including a safety catch so interconnecting the intermediate mold section and the locking ring that locks the latter to the movable mold section as to prevent rotative movement of said locking ring and mold section while the press is open and the intermediate mold section is separated from the stationary mold section.

14. A combination as defined in claim 11, in which the last mentioned means is a spring bolt that is manually operable from the exterior of the press to engage and disengage it from the mold locking rings and including a safety catch adapted to connect the intermediate mold section to the locking ring that secures said section to the movable mold section as to prevent relative rotative movement of said locking ring and mold sections while the press is open and the intermediate mold section is separated from the stationary mold section, the position of said safety catch being controlled by said spring bolt.

15. A dual vulcanizing press comprising a horizontal mold that comprises a stationary lower mold section, a movable upper mold section, and an intermediate section between the aforesaid mold sections, and respective rotatable locking rings for securing the intermediate section to the lower section and for securing the intermediate section to the upper mold section, said locking rings being interconnected for concurrent operation and so constructed and arranged that when one ring is in locking position the other is in unlocking position.

16. In a vulcanizer press of the character described, the combination of a pair of vulcanizer sections movable relatively of each other to open and close the press, locking means for retaining said sections in closed position, a pair of vulcanizing molds within the sections, and locking means for said molds connected and operated by said vulcanizer sections' locking means.

17. In a dual vulcanizing press, the combination of a stationary vulcanizer section; a vulcanizer section movable relatively thereof to open and close the press; a rotatable circumferential locking ring for retaining said sections in closed condition; a pair of molds within the press; said molds comprising a section secured to the stationary vulcanizer section, a section secured to the movable vulcanizer section, and an intermediate mold section; and rotatable locking means for connecting the stationary mold section to the intermediate mold section and for connecting the intermediate mold section to the movable mold section at different positions circumferentially thereof, said locking means being connected to and movable with said locking ring.

GEORGE P. BOSOMWORTH.
EDWARD HECK.